Inventor
William L. Reid

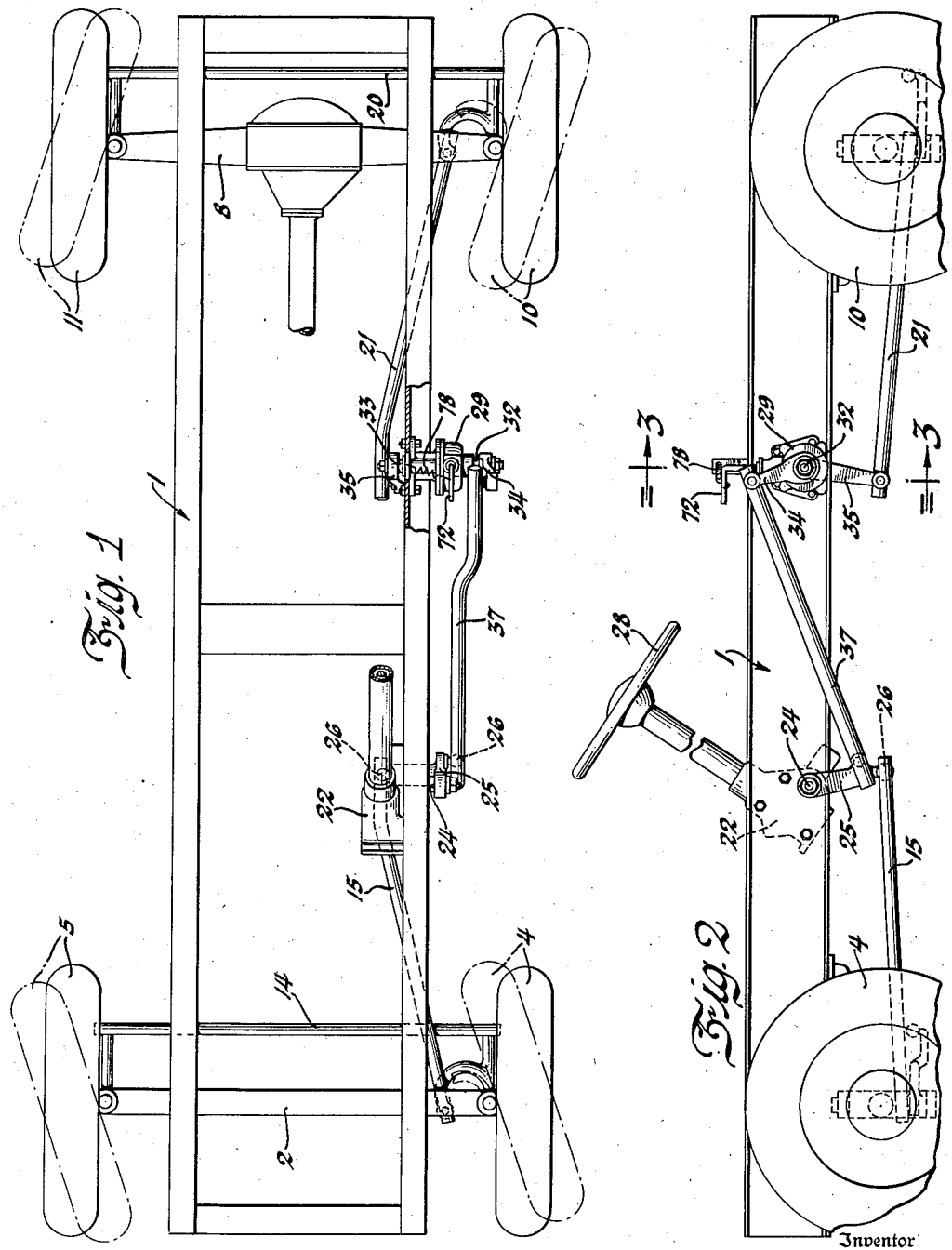

Patented Aug. 1, 1944

2,354,830

UNITED STATES PATENT OFFICE 2,354,830

ALTERNATIVE TWO OR FOUR WHEEL STEERING

William L. Reid, Saginaw, Mich., assignor to General Motors Corporation, Detroit, Mich., a corporation of Delaware Application August 10, 1942, Serial No. 454,246

2 Claims. (Cl. 280—91)

This invention relates to steering linkage for a motor vehicle.

It relates especially to a four wheel vehicle having means for steering the rear as well as the front road wheels when this is desirable for better maneuverability in a confined space.

The object of the invention is a motor vehicle with front dirigible road wheels having a steering linkage operated by a steering gear and rear dirigible road wheels having a steering linkage which is adapted to be coupled to the steering linkage for the front wheels for conjoint operation by said steering gear and alternatively to be uncoupled and locked to the vehicle frame in a straight ahead position.

A more specific object of the invention is a simple manually movable dog clutch means adapted in one position to couple two steering linkages together and in another position to disconnect said steering linkage and lock one of them to the vehicle frame.

The above and other objects of the invention will be apparent as the description proceeds.

According to the invention, both the front and rear sets of road wheels of a motor vehicle are dirigible wheels and each set is provided with a steering linkage. The steering linkage for the front wheels is connected to a steering gear by which the wheels are steered, and the steering linkage for the rear wheels is adapted to be connected to said steering gear for conjoint operation by said steering gear, and alternatively to be locked to the vehicle frame in a straight ahead position.

The drawings show the application of the invention to a motor vehicle, and the means for coupling the steering linkages together for conjoint operation, and alternatively for locking the steering linkage of the rear wheels to the vehicle frame.

In the drawings:

Figure 1 is a plan view of a motor vehicle chassis to which the invention has been applied.

Figure 2 is a view in elevation.

Figure 3:
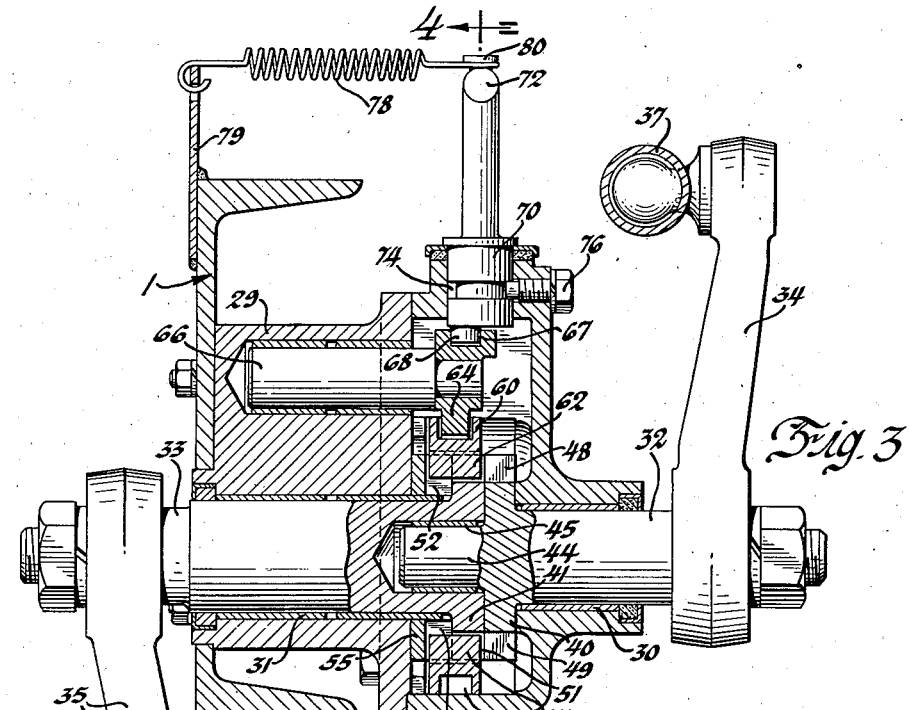
Figure 3 is an enlarged sectional view on line 3—3 of Figure 2.

The vehicle frame 1 is supported on a front axle 2 carrying dirigible road wheels 4 and 5, and a rear axle 8 carrying dirigible road wheels 10 and 11.

The front dirigible road wheels are provided with a steering linkage which includes a track rod 14 and a drag link 15, and the rear dirigible road wheels are provided with a steering linkage which includes a track rod 20 and a drag link 21.

Mounted on the vehicle frame 1 is a steering gear 22 with a rock shaft 24 from which a pitman arm 25 depends. To the ball end 26 of the pitman arm, the drag link 15 is pivotally connected so that steering movement of the front wheels 4 and 5 can be effected by turning of the steering wheel 28.

Secured to the vehicle frame 1, between the steering gear 22 and the rear axle 8, is a housing 29 with bearing bushings 30 and 31 for two coaxial shafts 32 and 33, parallel to the rock shaft 24. A lever arm 34 is secured to the outer end of the shaft 32, and a pitman arm 35, to the ball end 36 of which the drag link 21 is pivotally connected, is secured to the outer end of the shaft 33.

There is a connecting link 37 between the upwardly directed lever arm 34 of the shaft 32 and the dependent pitman arm 25 of the steering gear rock shaft 24, so that turning movement of the shaft 24 is accompanied by turning movement of the shaft 32 in an opposite direction.

The inner adjacent ends of the shafts 32 and 33 are provided with flanges 40 and 41 while the shaft 32 has a spigot extension 44 supported in a bearing bushing 45 in the end of the shaft 33.

Diametrically opposite each other in the peripheries of the flanges 40 and 41 are slots 48, 49 and 50, 51 respectively, which are in alignment with each other and with similar slots 52, 53 formed in a plate 55 secured to the housing 29 by screws 56 when the front and rear dirigible road wheels are in the straight ahead position shown in full lines in Figure 1.

Slidable axially of the shafts 32 and 33 and over the flanges 40, 41 thereof when the front and rear road wheels are in the straight ahead position is a lock ring or dog clutch member 60 which has internal diametrically opposite lugs or dogs 62, 63 adapted in one position simultaneously to engage the slots 48, 49 and 50, 51 to couple the shafts together, and in another position simultaneously to engage the slots 50, 51 and 52, 53 to lock the rear road wheels in the straight ahead position with the shaft 32 uncoupled from the shaft 33 and free to idle upon steering movement of the front wheels. In an intermediate position it will be noted that the lugs 62, 63 engage all the slots 48, 49, 50, 51 and 52, 53. In other words, there is a time during the shifting of the lock ring from one operative position to the other, when the shafts 32 and 33 are coupled together and locked to the housing 29. This insures that the rear wheels are not released from locked position until they have been connected to the steering gear and vice versa, and hence are never free to wander.

The lock ring 60 is moved to one or the other of its required positions by a shifter fork 64 which engages an external annular groove 65 on the lock ring 60. The shifter fork 64 is secured to a sliding shaft 66 and has a slot 67 engaged by an eccentric boss 68 on a short shaft 70 which is turned by a handle 72 to slide the shaft 66 and shift the fork 64 and hence the lock ring 60 axially of the shafts 32 and 33. The short shaft 70 has an annular groove 74 in its periphery, and a stud 76 screw threaded in the housing 29 and extending into the groove 74 retains the shaft 70 with its eccentric boss 68 in operative relationship with the shifter fork 64.

Figure 4:
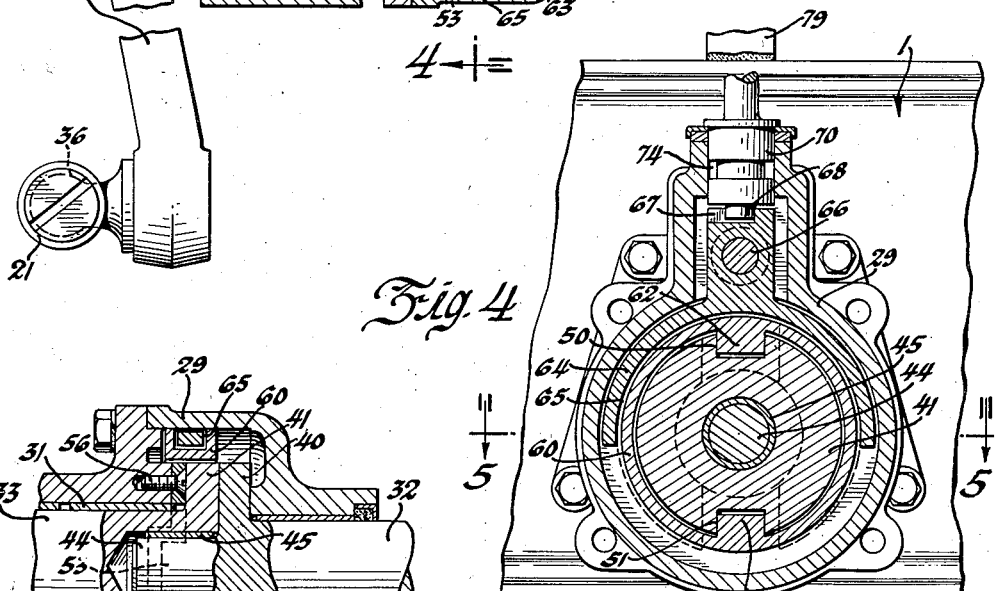
Figure 4 is a sectional view on line 4—4 of Figure 3.
Figure 5:
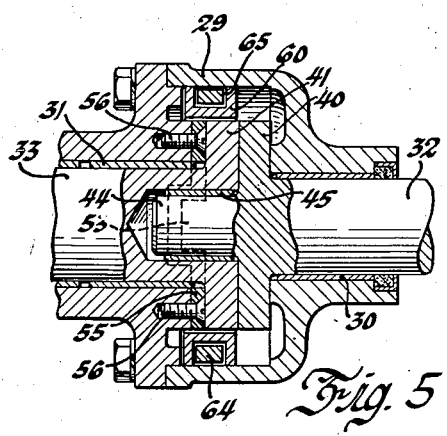
Figure 5 is a sectional view on line 5—5 of Figure 4.

In Figures 3 to 5, the shaft 33 is locked to the housing to lock the rear road wheels in the straight ahead position. The handle 72 is at the limit of its movement in a clockwise direction with the eccentric boss 68 at the end of the slot 67 (see Figure 4) and is held in this position by an over center tension spring 78 between a bracket 79 on the vehicle frame 1 and a button 80 on the handle 72.

The front road wheels being in the straight ahead position, with the slots 48, 49 and 50, 51 in alignment, the handle 72 may be turned anticlockwise through 180° to move ring 60 with its lugs 62, 63 to the right from the position shown in Figures 3 and 5 to engage the slots 48, 49 and then release it from the slots 52, 53, thus to couple the shafts 32 and 33 together and then unlock the shaft 33 to permit turning thereof and steering movement of the rear wheels conjointly with the front wheels upon turning of the steering wheel 28.

Since the linkage 37 between the rock shaft 24 and the shaft 32 is such that the latter turns in an opposite direction to the former, the rear road wheels are steered in an opposite direction to the front road wheels as indicated in Figure 1.

I claim:

1. In a motor vehicle, a pair of dirigible road wheels, means for steering said wheels including a manually operated rockshaft, arm means thereon, steering linkage connecting said wheels, a first drag link connecting said linkage and arm means, a second pair of dirigible wheels, second steering linkage for the wheels of said second pair, a second drag link terminally connected to said second linkage, a support on said vehicle midway between said pairs of wheels, first and second coaxial shafts rotatable in said support, first and second lever arms on the remote ends of said coaxial shafts respectively, the second drag link connected to the second lever arm, a connecting link terminally connected to the first lever arm and to the arm means of the rockshaft, jaw clutch means associated with the adjacent ends of said coaxial shafts and with said support whereby said adjacent ends of the coaxial shaft may be locked together or whereby the second coaxial shaft may be locked to the support.

2. The invention defined by claim 1, said jaw clutch means comprising a ring slidable over the adjacent coaxial shaft ends, said ring having internal radial lugs, said coaxial shaft ends and said support having radial slots to receive said lugs, said slots being so positioned that the lugs may slide therethrough to lock the second coaxial shaft to the first coaxial shaft or to the support only when the four wheels are positioned for straight away movement of the vehicle.

WILLIAM L. REID.